US 8,868,510 B2

(12) United States Patent
Gurajada et al.

(10) Patent No.: US 8,868,510 B2
(45) Date of Patent: Oct. 21, 2014

(54) MANAGING DATA STORAGE AS AN IN-MEMORY DATABASE IN A DATABASE MANAGEMENT SYSTEM

(75) Inventors: Aditya P. Gurajada, Hyderabad (IN);
Amarnadh Sai Eluri, Maharastra (IN);
Vaibhav A. Nalawade, Hadapsar (IN);
Jian Wu, Pleasanton, CA (US); Daniel Alan Wood, Fremont, CA (US);
Yanhong Wang, San Ramon, CA (US)

(73) Assignee: Sybase, Inc., Dublin, CA (US)

( * ) Notice: Subject to any disclaimer, the term of this patent is extended or adjusted under 35 U.S.C. 154(b) by 319 days.

(21) Appl. No.: 12/726,063

(22) Filed: Mar. 17, 2010

(65) Prior Publication Data

US 2011/0138123 A1  Jun. 9, 2011

Related U.S. Application Data

(60) Provisional application No. 61/266,313, filed on Dec. 3, 2009.

(51) Int. Cl.
*G06F 17/30* (2006.01)

(52) U.S. Cl.
USPC .......................................... 707/660; 707/803

(58) Field of Classification Search
CPC ............. G06F 17/30; G06F 17/30132; G06F 12/0802; G06F 12/0866; G06F 12/0868
USPC .......... 707/999.003, 609, 662, 666, 660, 803, 707/736, 747; 711/133, 137, 113
See application file for complete search history.

(56) References Cited

U.S. PATENT DOCUMENTS

| | | | | |
|---|---|---|---|---|
| 6,052,681 A * | 4/2000 | Harvey | ................. | 707/999.003 |
| 6,397,216 B1 * | 5/2002 | Cattanach et al. | ............ | 707/752 |
| 6,728,840 B1 * | 4/2004 | Shatil et al. | .................... | 711/113 |
| 2002/0174138 A1 * | 11/2002 | Nakamura et al. | ............ | 707/200 |
| 2004/0010502 A1 | 1/2004 | Bomfim et al. | | |
| 2008/0222111 A1 * | 9/2008 | Hoang et al. | ...................... | 707/3 |
| 2011/0041006 A1 | 2/2011 | Fowler | | |

OTHER PUBLICATIONS

Sybase, Inc., "Final Evaluation Report Sybase SQL Server Version 11.0.6 and Secure SQL Server Version 11.0.6", Chapter 4: Software Architecture, Mar. 3, 1997; pp. 66-70.
Non-Final Rejection mailed Dec. 29, 2011 for U.S. Appl. No. 12/816,233, filed Jun. 15, 2010; 14 pages.
Final Rejection mailed Jun. 22, 2012 for U.S. Appl. No. 12/816,233, filed Jun. 15, 2010; 16 pages.

* cited by examiner

*Primary Examiner* — Vincent F Boccio
(74) *Attorney, Agent, or Firm* — Sterne Kessler Goldstein & Fox P.L.L.C.

(57) ABSTRACT

System, method, computer program product embodiments and combinations and sub-combinations thereof for managing data storage as an in-memory database in a database management system (DBMS) are provided. In an embodiment, a specialized database type is provided as a parameter of a native DBMS command. A database hosted entirely in-memory of the DBMS is formed when the specialized database type is specified.

33 Claims, 17 Drawing Sheets

| cdesc& cdesc_ptr | bpool_desc | dummy buffers | c1_pages |
|---|---|---|---|
| c2_pages | | c3 pages | c4 pages |

| c1_bufs | c1_ht | c2_bufs | c2_ht | c3_bufs | c3_ht | c4_bufs | c4_ht |

| cdesc & cdesc_ptr | bpool_desc | dummy buffers | c1_bufs | c1_ht |
|---|---|---|---|---|
| c2_bufs | c2_ht | c3_bufs | c3_ht | c4_bufs | c4_ht | c1_pages |
| c2_pages | | c3_pages | | c4_pages | | |

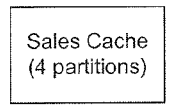

Sales Cache
(4 partitions)

Cachelet 1 – All the boxes with same grid pattern represent the pages hashed in cachelet 1 hash table.

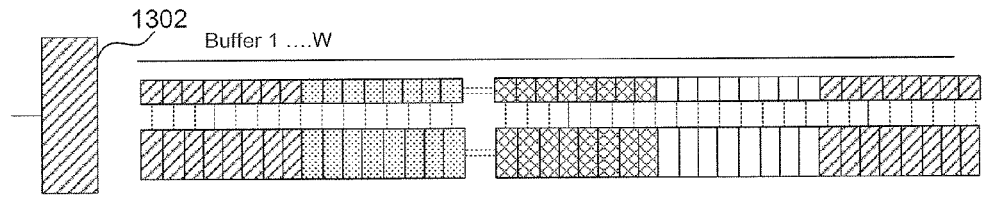

Cachelet 2 – All the boxes with same grid pattern represent the pages hashed in cachelet 2 hash table.

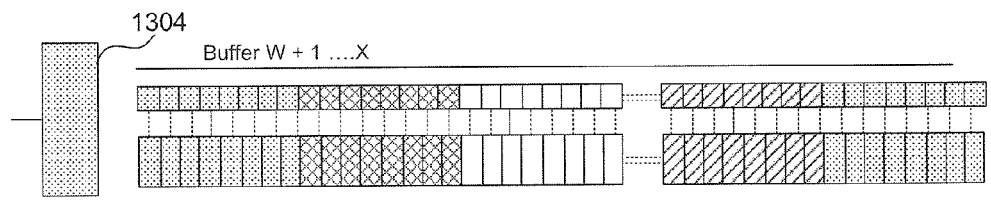

Cachelet 3 – All the boxes with same grid pattern represent the pages hashed in cachelet 3 hash table.

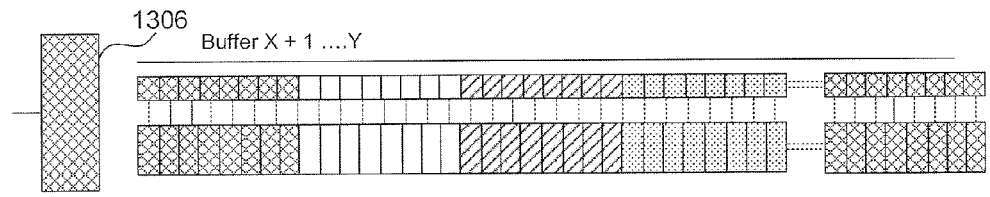

Cachelet 4 – All the boxes with same grid pattern represent the pages hashed in cachelet 4 hash table.

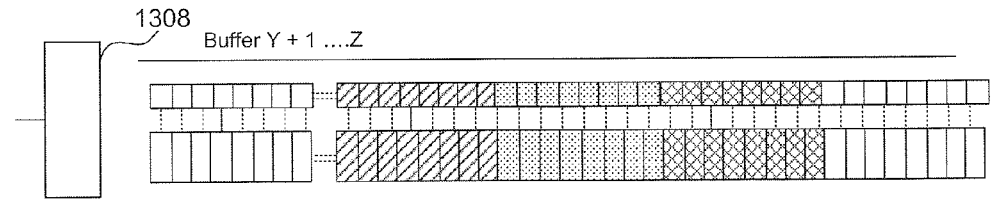

FIG. 13

| CDMAPFM | | |
|---|---|---|
| CDISKMAP1 | CDISKMAP2 | CDISKMAP3 |
| clet = 1<br>chunk_idx = 1<br>chunk_startpg = 0<br>chunk_endpg = 511<br>Aus_in_chunk = 2 | clet = 1<br>chunk_idx = 2<br>chunk_startpg = 512<br>chunk_endpg = 1023<br>Aus_in_chunk = 2 | clet = 1<br>chunk_idx = 3<br>chunk_startpg= 1024<br>chunk_endpg = 2303<br>Aus_in_chunk = 5 |
| CDISKMAP4 | CDISKMAP5 | CDISKMAP6 |
| clet = 2<br>chunk_idx = 4<br>chunk_startpg= 2304<br>chunk_endpg = 2815<br>Aus_in_chunk = 2 | clet = 2<br>chunk_idx = 5<br>chunk_startpg= 2816<br>chunk_endpg = 3327<br>Aus_in_chunk = 2 | clet = 2<br>chunk_idx = 6<br>chunk_startpg= 3328<br>chunk_endpg = 4607<br>Aus_in_chunk = 5 |

FIG. 17

| DISKMAP1<br>(dev1) |
|---|
| lstart = 0<br>vstart = 0<br>size = 2304<br>vdevno = 1 |

| DISKMAP2<br>(dev2) |
|---|
| lstart = 2304<br>vstart = 2304<br>lsize = 2304<br>vdevno = 2 |

FIG. 19

MANAGING DATA STORAGE AS AN IN-MEMORY DATABASE IN A DATABASE MANAGEMENT SYSTEM

CROSS-REFERENCE TO RELATED APPLICATIONS

The present application claims the benefit of U.S. Provisional Appl. No. 61/266,313, filed Dec. 3, 2009, which is incorporated by reference herein in its entirety.

BACKGROUND

1. Field of the Invention

The present invention relates to database management systems and, more particularly, to a system and methodology for providing an in-memory database fully integrated in a traditional disk-resident database management system.

2. Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially Chapters 1-4), Addison Wesley, 2000.

In operation, a DBMS frequently needs to retrieve data from or persist data to storage devices such as disks. Unfortunately, access to such storage devices can be somewhat slow. To speed up access to data, databases typically employ a "cache" or "buffer cache" which is a section of relatively faster memory (e.g., RAM) allocated to store recently used data objects. Throughout the remainder of the specification, this faster memory will simply be referred to as "memory," as distinguished from mass storage devices such as disks. Memory is typically provided on semiconductor or other electrical storage media and is coupled to a CPU (central processing unit) via a fast data bus which enables data maintained in memory to be accessed more rapidly than data stored on disks.

As memory provided on computer systems has a limited size, some method must be employed for managing what content is maintained in cache memory. Conventionally, data storage systems employ some form of a "least recently used-most recently used" (LRU/MRU) protocol to queue data objects in the buffer cache. Basically, such LRU/MRU protocol moves the "most recently used" data object to the head of the queue while simultaneously moving data objects that have not been used one step towards the end of the queue. Thus, infrequently used objects migrate toward the end of the queue, and ultimately are deleted from the buffer cache to make room for new data objects copied from disks (i.e., infrequently used objects are displaced by more recently used objects). In this manner, the most recently used data objects are the only objects stored in the buffer cache at any given time.

Unfortunately, the basic LRU/MRU memory management protocol is subject to a number of limitations. As a result, other approaches providing for greater efficiency in management of data objects in cache have been adopted. For example, U.S. Pat. No. 6,061,763 provides for partitioning computer memory provided in a single cache, symmetric multiprocessor (SMP) system into a plurality of buffer caches, each of which buffer caches is separately addressable and may be configured to retain data objects meeting specified criteria. Although this approach provides considerable performance improvements over the basic LRU/MRU protocol, problems remain in providing fast access to data in database systems.

Among the issues not addressed by current database management system solutions is the fact that these existing solutions are not designed to support the running of an entire database fully in-memory without any on-disk storage and integrated tightly with the database server engine. Some software components, such as SolidDB from IBM™ Corporation (Armonk, N.Y.) or TimesTen from ORACLE™ Corporation (Redwood City, Calif.), are available to provide some level of support of an in-memory database, but these are stand-alone products operating as an add-on to the operations of the database server and are not integrated within the database server engine.

In order to obtain better performance in a database system environment, what is needed is the ability to integrate support for a zero-disk footprint in-memory database in a database server. The solution should provide this support without any other external software components or other operating system support. Ideally, the solution should enable configuration of in-memory databases to provide users and administrators the ability to take advantage of hardware which can support large amounts of main memory with data collections that need high performance access. The present invention provides a solution for these and other needs.

BRIEF SUMMARY

Briefly stated, the invention includes system, method, computer program product embodiments and combinations and sub-combinations thereof for managing data storage as an in-memory database in a database management system (DBMS). In an embodiment, a specialized database type is provided as a parameter of a native DBMS command. A database hosted entirely in-memory of the DBMS is formed when the specialized database type is specified.

Further embodiments, features, and advantages of the invention, as well as the structure and operation of the various embodiments of the invention, are described in detail below with reference to accompanying drawings.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

FIG. 10 illustrates a layout resulting from the cache allocation for regular cache.

FIG. 11 illustrates a layout resulting from the cache allocation for an in-memory cache in accordance with an embodiment of the invention.

FIG. 13 illustrates an example diagram of an in-memory cache having 4 cachelets in accordance with an embodiment of the invention.

FIG. 17 illustrates CDISKMAPs for the example corresponding to FIG. 16.

FIG. 19 illustrates DISKMAP information for the example corresponding to FIG. 16.

Figure 1:
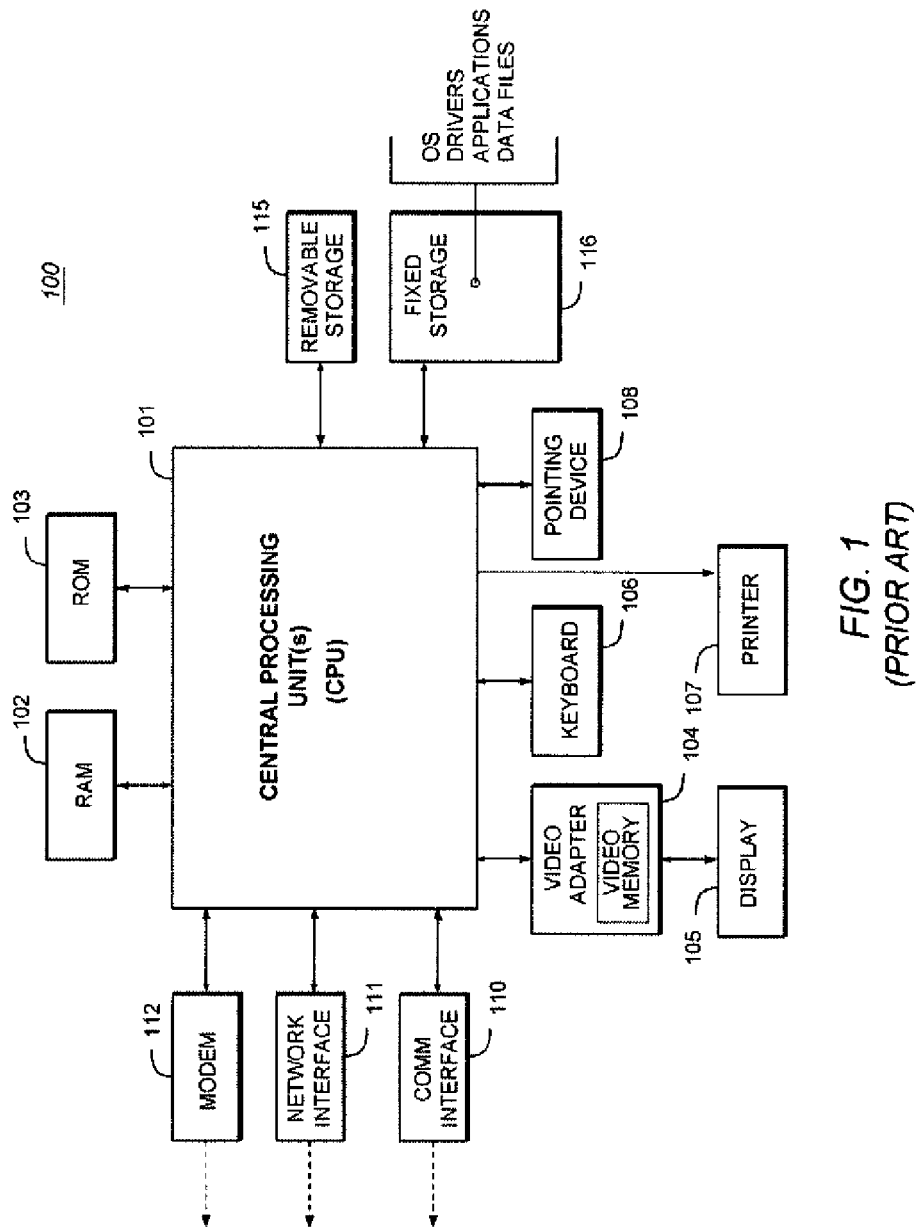
FIG. 1 illustrates a very general block diagram of a computer system (e.g., an IBM-compatible system) in which software-implemented processes of the present invention may be embodied.

The features and advantages of the present invention will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

The present invention relates to a system, method, computer program product embodiments and combinations and sub-combinations thereof for providing methodology for providing an in-memory database fully integrated in a traditional disk-resident database management system.

Glossary

The following definitions are offered for purposes of illustration, not limitation, in order to assist with understanding the discussion that follows.

Cache: a cache is a section of relatively faster memory (e.g., RAM) allocated to temporarily store data objects so as to provide faster access to such objects (e.g., when compared to access of such objects from disk).

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SMP: SMP stands for symmetric multi-processing system, which is a system comprised of multiple processors (CPUs) and a single RAM memory, which has a single instance of the operating system (O/S) running on it. All the CPUs serve and run all the functionality of the O/S and application symmetrically.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

IMDB: In-Memory database, a zero-disk footprint database which is hosted entirely in-memory in the buffer cache. No disk device is required to create and use such a database.

Named Cache: an area of memory that contains the in-memory images of database pages, as well as the data structures required to manage the pages. Each has a unique name which is used for configuration purpose. It may not be contiguous in the memory and might be portioned into multiple sub caches ('cache partition').

Cachelet/Cache Partition: the named cache memory partitioned further into unique labeled units in order to reduce the spinlock contention on the cache.

Control cache descriptor: a structure used to hold the metadata about the named cache and sub caches.

Buffer Pool: a grouping of a set of masses as a LRU-MRU chain inside each cache partition to facilitate large I/O access.

In-memory Storage Cache: a named cache in an IMDB with a specified cache type (e.g., 'inmemory_storage') being used to host the entire database, and effectively turning off I/O to disk during run-time operations of the server. Other buffer manager strategies like buffer grabbing, washing and replacement are also turned off for an in-memory storage cache.

In-memory device: This is a virtual device created over the in-memory storage cache that has similar information like disk devices but resides in the memory.

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the MICROSOFT™ Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, a HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, MICROSOFT™ Windows NT, MICROSOFT™ Windows 2000, MICROSOFT™ Windows XP, or MICROSOFT™ Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

Figure 2:
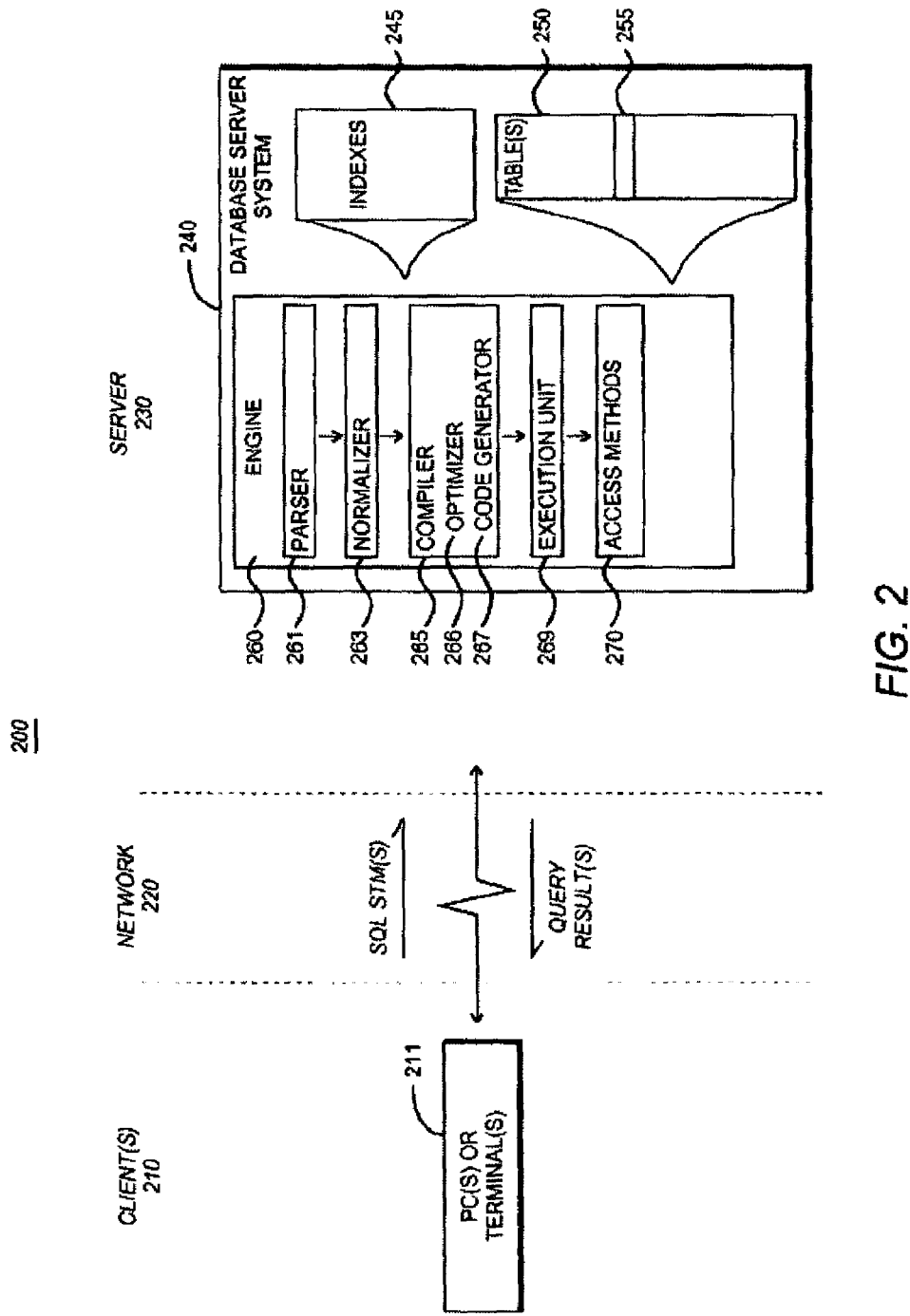
FIG. 2 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 2 illustrates the general structure of a client/server database system 200 suitable for implementing the present invention. As shown, the system 200 comprises one or more client(s) 210 connected to a server 230 via a network 220. Specifically, the client(s) 210 comprise one or more standalone terminals 211 connected to a database server system 240 using a conventional network. In an exemplary embodiment, the terminals 211 may themselves comprise a plurality of standalone workstations, dumb terminals, or the like, or comprise personal computers (PCs) such as the above-described system 100. Typically, such units would operate under a client operating system, such as a MICROSOFT™ Windows client operating system (e.g., MICROSOFT™ Windows 95/98, Windows 2000, or Windows XP).

The database server system 240, which comprises SYBASE™ ADAPTIVE SERVER™ Enterprise (ASE, available from Sybase, Inc. of Dublin, Calif.) in an exemplary embodiment, generally operates as an independent process (i.e., independently of the clients), running under a server operating system such as MICROSOFT™ Windows NT, Windows 2000, or Windows XP (all from Microsoft Corporation of Redmond, Wash.), UNIX (Novell), Solaris (Sun/Oracle), or Linux (Red Hat). The network 220 may be any one of a number of conventional network systems, including a Local Area Network (LAN) or Wide Area Network (WAN), as is known in the art (e.g., using Ethernet, IBM Token Ring, or the like). The network 220 includes functionality for packaging client calls in the well-known Structured Query Language (SQL) together with any parameter information into a format (of one or more packets) suitable for transmission to the database server system 240.

Client/server environments, database servers, and networks are well documented in the technical, trade, and patent literature. For a discussion of SYBASE™-branded database servers and client/server environments generally, see, e.g., Nath, A., "The Guide to SQL Server", Second Edition, Addison-Wesley Publishing Company, 1995. For a description of SYBASE™ Adaptive SYBASE™ Enterprise, see, e.g., "Adaptive Server Enterprise 15.0" documentation set from Sybase, Inc. of Dublin, Calif. This product documentation is available via the Internet (e.g., currently at sybooks.sybase.com/). The disclosures of the foregoing are hereby incorporated by reference.

The above-described computer hardware and software are presented for purposes of illustrating the basic underlying desktop and server computer components that may be employed for implementing the present invention. The present invention, however, is not limited to any particular environment or device configuration. Instead, the present invention may be implemented in any type of system architecture or processing environment capable of supporting the methodologies of the present invention presented in detail below.

In operation, the client(s) 210 store data in, or retrieve data from, one or more database tables 250, as shown at FIG. 2. Data in a relational database is stored as a series of tables, also called relations. Typically resident on the server 230, each table itself comprises one or more "rows" or "records" (tuples) (e.g., row 255 as shown at FIG. 2). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of the Structured Query Language (SQL), which is a language allowing users and administrators to create, manipulate, and access data stored in the database. The syntax of SQL is well documented; see, e.g., the above-mentioned "An Introduction to Database Systems". SQL statements may be divided into two categories: data manipulation language (DML), used to read and write data; and data definition language (DDL), used to describe data and maintain the database. DML statements are also called queries. In operation, for example, the clients 210 issue one or more SQL commands to the server 230. SQL commands may specify, for instance, a query for retrieving particular data (i.e., data records meeting the query condition) from the database table(s) 250. In addition to retrieving the data from database server table(s) 250, the clients 210 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 210 (via network 220) are processed by the engine 260 of the database server system 240. The engine 260 itself comprises a parser 261, a normalizer 263, a compiler 265, an execution unit 269, and access methods 270. Specifically, the SQL statements are passed to the parser 261 which converts the statements into a query tree—a binary tree data structure which represents the components of the query in a format selected for the convenience of the system. In this regard, the parser 261 employs conventional parsing methodology (e.g., recursive descent parsing).

The query tree is normalized by the normalizer 263. Normalization includes, for example, the elimination of redundant data. Additionally, the normalizer 263 performs error checking, such as confirming that table names and column names which appear in the query are valid (e.g., are available and belong together). Finally, the normalizer 263 can also look-up any referential integrity constraints which exist and add those to the query.

After normalization, the query tree is passed to the compiler 265, which includes an optimizer 266 and a code generator 267. The optimizer 266 is responsible for optimizing the query tree. The optimizer 266 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 267 translates the query execution plan selected by the query optimizer 266 into executable form for execution by the execution unit 269 using the access methods 270.

For enhancing the storage, retrieval, and processing of data records, the server 230 maintains one or more database indexes 245 on the database tables 250. Indexes 245 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed. An additional consideration with respect to I/O is whether it is sequential or random. Due to the construction of hard disks, sequential I/O is much faster then random access I/O. Data structures and algorithms encouraging the use of sequential I/O can realize greater performance. In typical implementations, this can be done by using data structures and algorithms that maximize the use of pages that are known to reside in the cache or by being more selective about what pages are loaded into the cache in the first place.

Among the issues not addressed by current database management system solutions is the fact that these existing solutions are not designed to support the running of an entire database fully in-memory without any on-disk storage and integrated with the database server. Accordingly, through the embodiments of the present invention, an in-memory database is created entirely in a named cache, without any on-disk storage. A few new concepts in the area of caches and devices are introduced as part of the approach, as described further herein below As is generally understood, disk-resident databases are created using a command, such as for example, the CREATE DATABASE command in ASE, in which a series of named logical disk devices are listed, specifying the size to use on them as data devices, followed by naming a list of logical disk devices and their size for the transaction log. Database configuration on these devices can subsequently be altered using another command, such as an ALTER DATABASE command, to extend the database's data or log segments on different logical devices.

Figure 3:
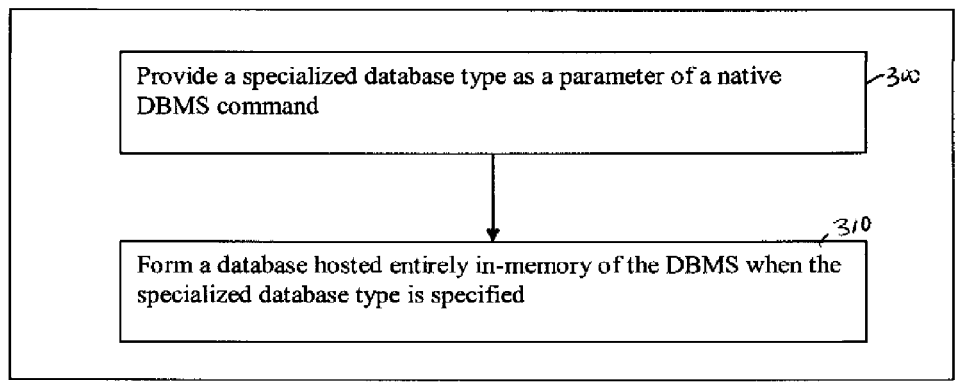
FIG. 3 illustrates a block diagram of an overall approach for supporting an in-memory database in a database server system in accordance with embodiments of the invention.

In accordance with the present invention, enhancements to the database manager system 240 now extend this model to create in-memory databases entirely on in-memory devices created on in-memory storage caches. In general, database fragments for the data and log segments are able to be defined on one or more in-memory devices, which then creates an entirely in-memory database with zero-disk foot print. Such databases provide full run-time transactional support with no I/O to disk FIG. 3 illustrates a block diagram of an overall approach for supporting an in-memory database in a database server system in accordance with embodiments of the invention. The process includes providing a specialized database type as a parameter of a native DBMS command (block 300), and forming a database hosted entirely in-memory of the DBMS when the specialized database type is specified (block 310). In an embodiment, creating an in-memory database (IMDB) is done directly on a named cache which has been pre-configured as in-memory cache. This system allows for the possibility of creating an in-memory database directly on multiple named caches, to support separately data pages and a log segment.

Creating in-Memory Device

Implementation of cache configuration methodology of the present invention for the creation of an in-memory cache includes changes and additions to stored procedures. Stored procedures provided in the presently preferred embodiment include those described in the following discussion.

sp_cacheconfig: This procedure creates, drops, or modifies named caches. To support cache devices hosting the IMDBs with the basic property of no I/O to disk, new qualifiers for the existing cache type parameter of the sp_cacheconfig procedure are introduced, including a qualifier, e.g., "inmemory_storage", that describes the cache as being entirely in-memory, and effectively turns off I/O to disk during run-time operations of the server. Other buffer manager strategies like buffer grabbing, washing and replacement are also turned 'OFF' for an "inmemory_storage" cache in accordance with an embodiment of the invention.

By way of example, an extended syntax for the cache configuration procedure, sp_cacheconfig, suitable for specifying the memory qualifier is:

```
sp_cacheconfig [ cache_name ] [, " size [ P | K | M | G ]" ]
    [, logonly | mixed [ inmemory_storage] ]
    [, strict | relaxed | none]
        [, "cache_partition=[1 | 2 | 4 | 8 | 16 | 32 | 64 | 128]" ]
```

In this manner the in-memory storage cache is able to be configured no differently from a regular named cache, as it can be created with regular sp_cacheconfig interfaces with 'inmemory_storage' as the cache type and with 'none' as the replacement strategy.

Cache creation includes cache initialization to provide the logical in-memory layout of the in-memory storage cache, which allows the storage cache to be treated as raw storage and carved up into individual in-memory devices for hosting the in-memory database. These individual devices represent contiguous physical storage akin to the on-disk storage, except that they are entirely in-memory and may not be contiguous. Further, these cache devices provide the framework for fully supporting segments and allows for supporting objects bound to the segments, where an entire object is resident in one cache, and all objects; i.e. the entire database, can be bound to one cache.

Through extensions to the existing commands for disk initialization, these smaller in-memory devices are created, which are then used to create the database. For example, the following represents a "disk init" interface specifying an in-memory device "imdb_data_dev1" for an in-memory storage cache "imdb_cache" with a size of 2G (gigabytes).

```
disk init name = 'imdb_data_dev1',
    physname = 'imdb_cache',
    type = 'inmemory',
    size = '2.0g'
```

Thus, 'disk init' provides the interface for creating the virtual cache device and is similar to that used for the regular disk-based devices, except the "physname" of the device names the in-memory storage cache, and an additional argument 'type' is supplied with the keyword 'inmemory'. The specified size of the device should not exceed the maximum size of the device that can be carved from the cache.

Figure 4:
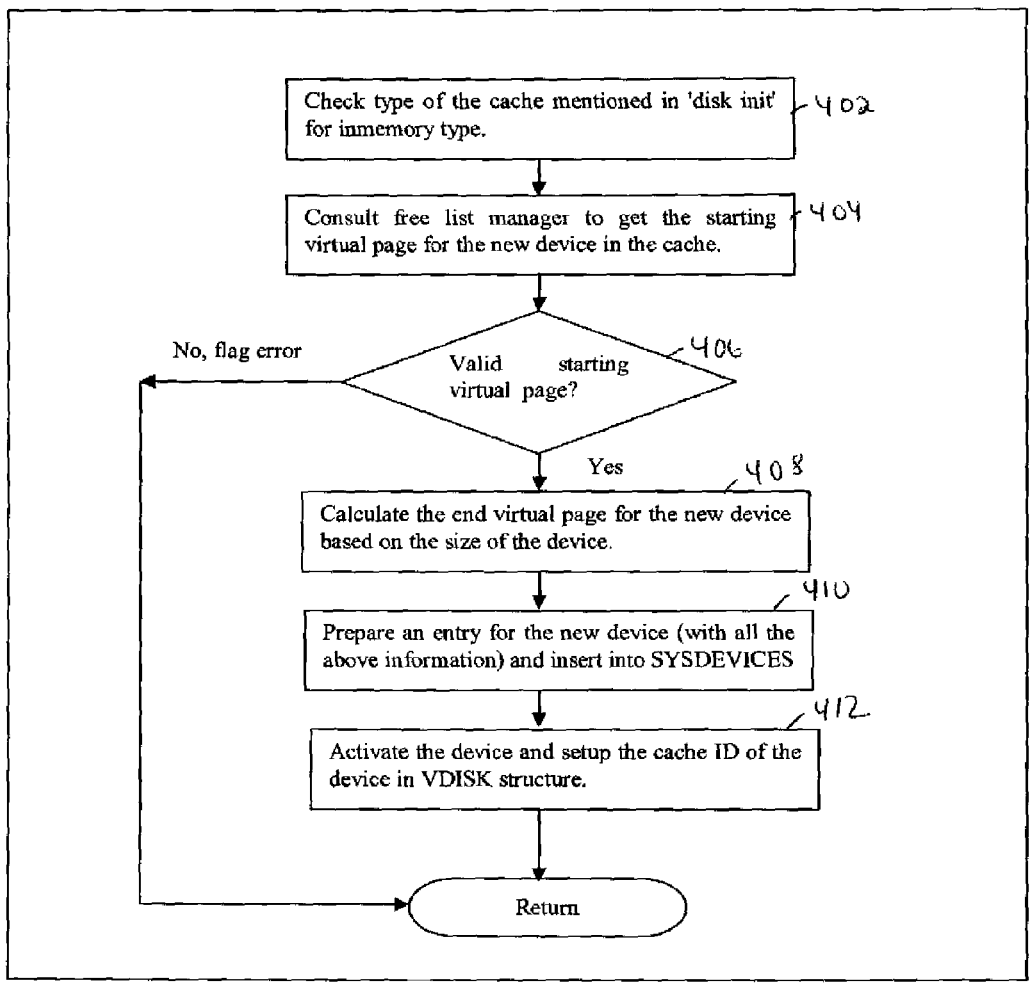
FIG. 4 illustrates a block diagram of a process to create the in-memory devices in accordance with an embodiment of the invention.

A process to create the in-memory devices in accordance with an embodiment of the invention is illustrated in the block flow diagram of FIG. 4. The process initiates by validating the type of the cache mentioned in physname option of the disk init command (block 402). When the cache is a valid in-memory storage cache, the free list manager is checked for a valid starting virtual page number for the new device (block 404), where the free list manager, as its name implies, refers to a list of items with information about the free memory segments in the cache (i.e., starting virtual page number and size of the memory segment).

If the free list manager returns a valid starting virtual page number (as determined via block 406), then an end virtual page number for the device is calculated based on the size of the device and the starting page number (block 408). An entry for the device then is inserted in SYSDEVICES with the virtual page number information (block 410). As is commonly known, SYSDEVICES refers to a system table for managing storage in the master database of the system, containing one row for each database device and may contain a row for each dump device (tape, disk, or operating system file) available to the system. The device is then activated and the cache identifier of the device is set-up in a virtual disk structure (VDISK) (block 412), where VDISK refers to the Kernel layer's representation of the logical device, and is typically used to drive the I/O requests from the logical page in-memory to the physical storage on-disk.

If an in-memory device later needs to be dropped, a stored procedure may be used, e.g., sp_dropdevice, which operates similarly to dropping disk devices with an additional step of returning memory occupied by the device free list manager associated with the cache, as is well appreciated to those skilled in the art. Once created, however, the device may then be used for hosting an in-memory database.

Creating In-Memory Databases

In an embodiment, creation of an in-memory database over the in-memory devices occurs through a "CREATE DATABASE" command. By way of example, the following SQL code creates an in-memory database on a single in-memory device, also referred to as a cache device, of size 2G,

```
create inmemory database imdb
    on imdb_data_dev1 = '1.0g'
    log on imdb_data_dev1 = '0.5g'
    with override, durability = NO_RECOVERY
```

Figure 5:
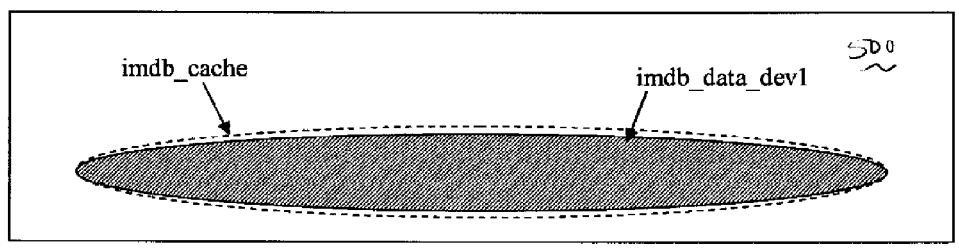
FIG. 5 illustrates an example representation of a single in-memory device, created of a size equal to that of the in-memory storage cache in accordance with an embodiment of the invention.

Use of the "with override" clause allows for the creation of data and log segments on the same cache device, while the clause "with durability=NO_RECOVERY" ensures that the users creating the IMBD realize that IMDBs do not provide any durability upon a server crash and ensures that there is no inadvertent change in behavior for existing databases. FIG. 5 illustrates a representation 500 of such a single in-memory device, imdb_data_dev1, created of a size equal to that of the in-memory storage cache, imdb_cache, as in this example. The in-memory database, imdb, is created directly on the device, with the data and log segments mapped to the same device.

As another example, the following SQL code creates an in-memory database on multiple cache devices, with log and data segments on dedicated devices,

```
create inmemory database imdb
    on cache_device1 = '100m'
    , cache_device2 = '200m'
    log on cache_logdev3 = '50m'
    with override, durability = NO_RECOVERY
```

Figure 6:
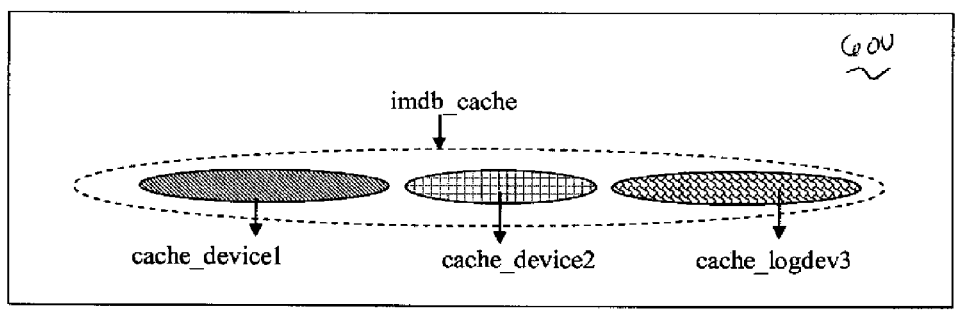
FIG. 6 illustrates an example representation where a single in-memory storage cache is carved up into multiple in-memory devices in accordance with an embodiment of the invention.

FIG. 6 illustrates a representation 600 where a single in-memory storage cache, imdb_cache, is carved up into multiple in-memory devices, cache_device1, cache_device2, and cache_logdev3, as in this example. The in-memory database is created on these devices, using two devices for the data segment and one device for the transaction log. For illustration, it is shown as though the sum of the sizes of the individual devices is far less than the total size of the cache. This demonstrates that further expansion of the database in this storage cache is possible by creating new in-memory devices on the remaining unused space, and then extending the database on these new devices.

Alternatively, it is recognized that future enhancements are possible, such as for a configuration that may be sought where the in-memory database is effectively created on two or more in-memory storage caches, with the transaction log segment created on in-memory device(s) residing on a cache different from the cache on which the other data devices are created. This configuration would allow for the possibility of plugging in external RAM disk storage or dedicated battery backed-up memory for the log devices, so as to provide a degree of resilience against server crashes.

Figure 7:
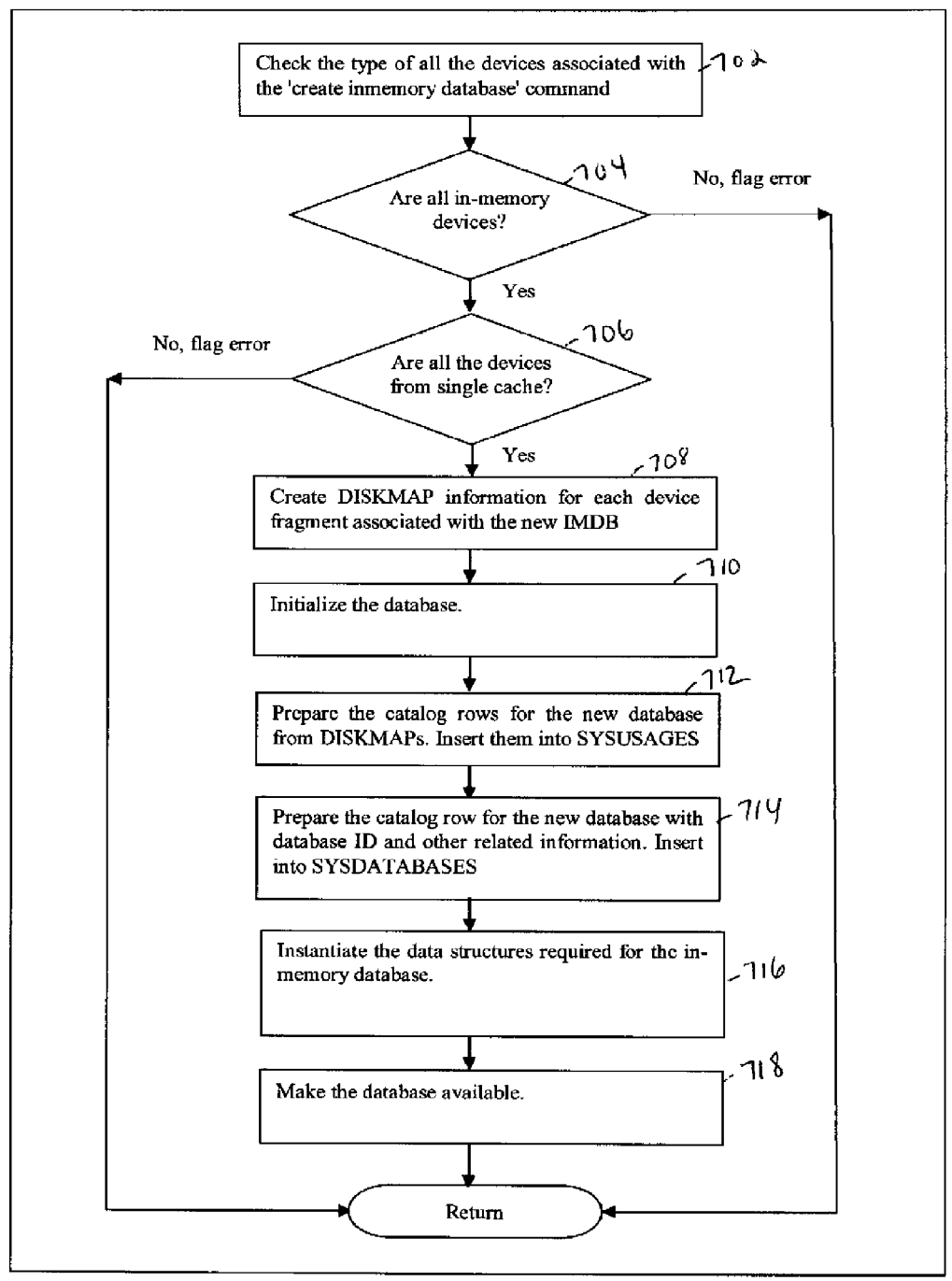
FIG. 7 illustrates a block flow diagram of a process that creates an in-memory database over in-memory devices in accordance with an embodiment of the invention.

FIG. 7 illustrates a block flow diagram of a process that creates an in-memory database over in-memory devices. The process initiates by validating the device information associated with the CREATE DATABASE command (block 702). If all the devices are in-memory devices (as determined via block 704) and carved from a single in-memory storage cache (as determined via block 706), then a DISKMAP is instantiated for each of the device fragments (block 708). DISKMAP refers to a common structure created for all the databases in the database engine and includes the database information associated with a device, such as a starting logical page of the database, size of the database, starting virtual page of the device associated with the starting logical page number of the database and segment map associated with the device (i.e. log segment or user defined segments). DISKMAPs are described further herein below, including with reference to the example of FIG. 19.

After successful creation of DISKMAP for the in-memory database, the initialization of the database occurs (block 710) with the pages from the "MODEL" database (a template for the new user database) that are required for activating the database, as described in further detail herein below with reference to FIG. 8. Once initialized, the catalog rows for the new database are prepared from the DISKMAP and inserted into a system table, SYSUSAGES (block 712). Also, the catalog rows with the database identifier and other related information are prepared and inserted in a system table SYSDATABASES (block 714). The data structures are also instantiated (block 716) and the created in-memory database is made available online for other clients (block 718).

Figure 8A:
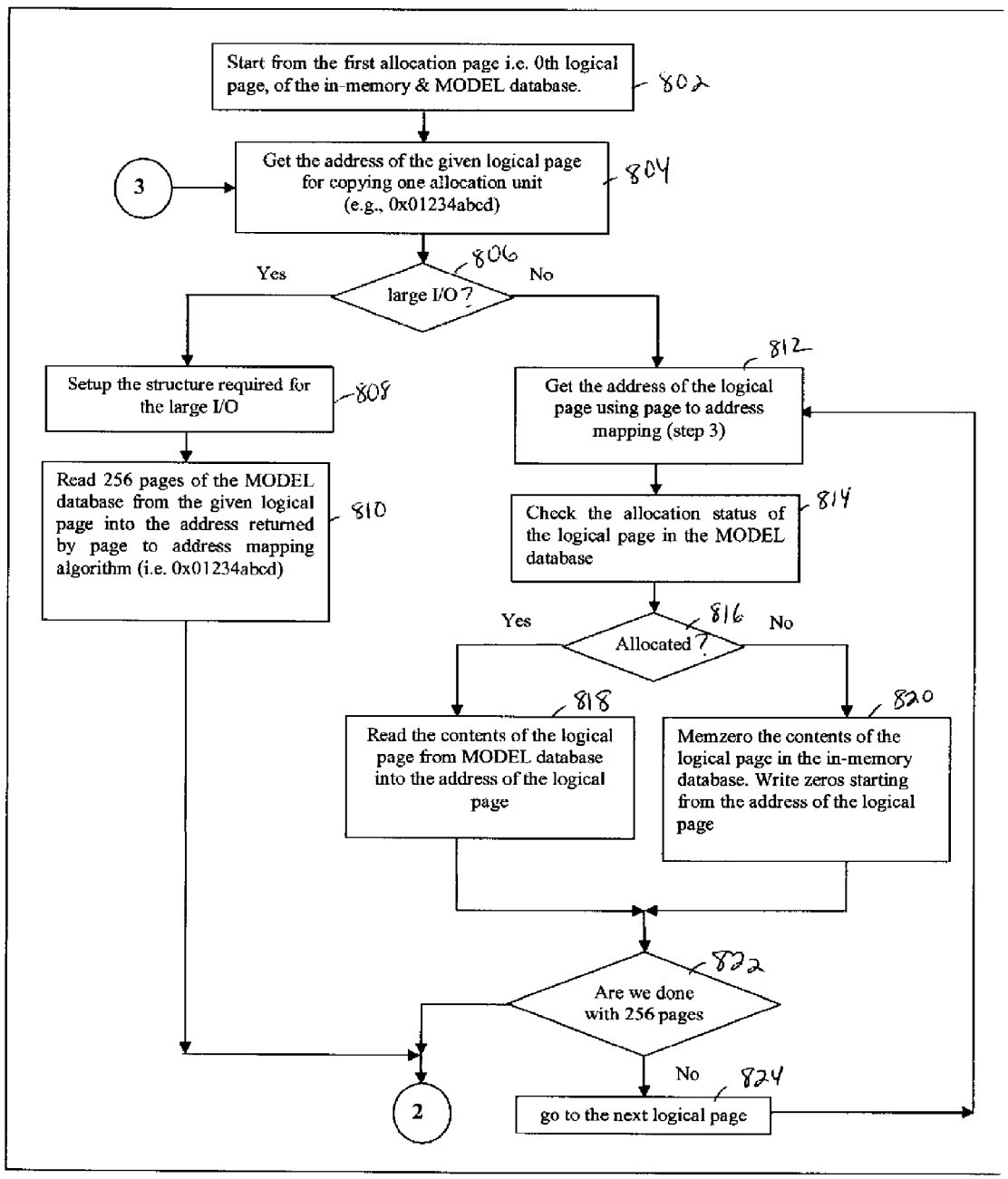
FIGS. 8a and 8b illustrate a block flow diagram for initialization of an in-memory database as part of the creation process of FIG. 7 in accordance with an embodiment of the invention.
Figure 8B:
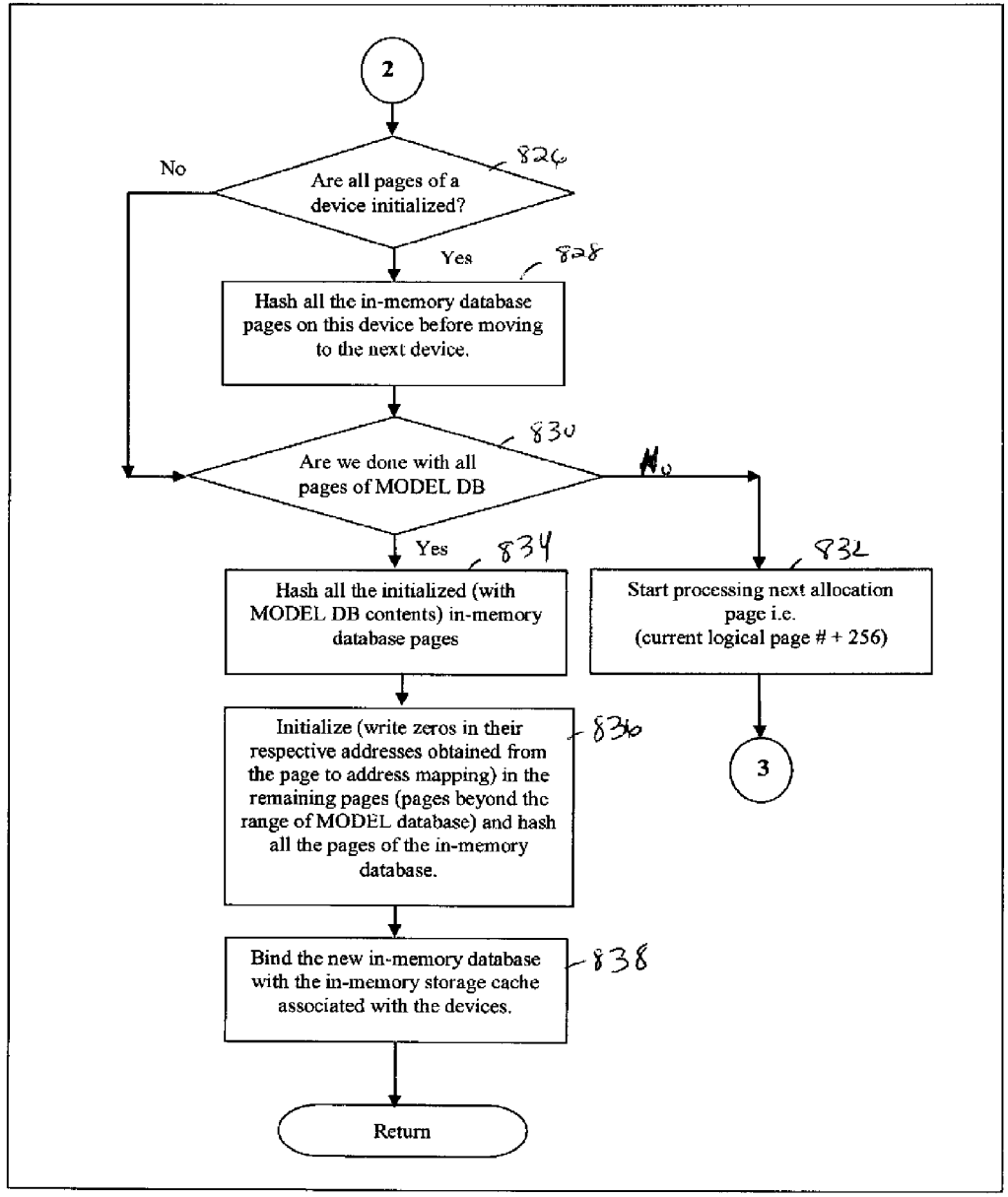

As part of the creation, initialization of the in-memory database occurs (block 710, FIG. 7), as presented with reference to the block flow diagram of FIGS. 8a and 8b. In general, the process copies the pages of the MODEL database into the in-memory database, one allocation unit (e.g., 256 pages) at a time. The copying starts with the first allocation unit (i.e. 0-255 logical pages) of the MODEL database into the first allocation unit of in-memory database and proceeds with the other allocation units (i.e. 256-511, 512-767 . . . etc.). The address of the given logical page number (0, 256, 512 . . . etc.) in the in-memory database is retrieved with the allocation unit of the MODEL database read into that address. These reads copy the pages in their respective address of in-memory database. For example, if logical page 0 has address 0x1234abcd, then the pages of MODEL database from 0-255 will be read into 0x1234abcd. If the process fails to copy all the 256 pages in one read (e.g., when large I/O may not be supported), the address of each page of the allocation unit in the in-memory database is retrieved and all the allocated pages of MODEL database are read into their respective address. Alternatively, if the page is not allocated in the MODEL database (i.e., a free page), then zeros (equal to a server page size) are written at that address.

Referring now to FIGS. 8a and 8b, the process initiates from the first allocation page (logical page 0) of the in-memory and MODEL database (block 802) and retrieves the address of the given logical page for copying one allocation unit (e.g., 0x01234abcd) (block 804). The process then includes a determination of whether large I/O is supported (block 806). If so, the structure for the large I/O is set-up (block 808), and an allocation unit (e.g., 256 pages) of the MODEL database from the given logical page is read into the address returned by the page to address mapping process (i.e., 0x01234abcd) (block 810).

When large I/O is not supported, the address of the logical page is determined by using page to address mapping (block 812). The status of the allocation for the logical page in the MODEL database is checked (block 814) and if allocated (as determined via block 816), the contents of the logical page from the MODEL database are read into the address of the logical page (block 818). When not allocated, a memzeroing of the contents of the logical page in the in-memory database is done (i.e., zeroes are written starting from the address of the logical page) (block 820). The process continues with a next logical block until all pages of the allocution unit (e.g., 256 pages) are done, via blocks 822 and 824.

The process continues by determining whether all pages of a device are initialized (block 826). If so, the in-memory database pages are hashed on this device before moving to the next device (block 828). Once the hashing is done or when not all pages are initialized, the process continues by determining whether all pages of the MODEL database have been processed (block 830). If not, the process proceeds with a next allocation page, identified as the current logical page+the size of the allocation unit, e.g., 256 (block 832) and returns to block 804. Once all the pages of the MODEL database are done, all of the initialized in-memory database pages including the MODEL database contents are hashed (block 834). Initialization in the remaining pages (i.e., the pages beyond the range of the MODEL database) occurs through writing zeroes in the respective addresses obtained from the page to address mapping and all pages of the in-memory database are hashed (block 836). The in-memory database is then bound with the in-memory storage cache associated with the devices (block 838).

Mapping each logical page number into the physical address is a unique concept for the in-memory databases. The goal of the mapping process is to map the logical pages of the in-memory databases into the logical page layout of the cache, with each database logical page mapped to a logical page in the cache. Data structures are added to map the logical page of a database into physical address in the memory. By way of example, CACHE_DESC is a structure used to hold the information related to the named caches and holds the information related to the in-memory storage caches used for the in-memory database. Another structure, e.g., CACHE_CHUNK, is used to hold the information about the memory associated with the named cache. It keeps the starting and ending memory address given to the cache by the operating system. A cache can have multiple CACHE_CHUNKs depending on the size of the cache, i.e., if the operating system grants the entire memory in one request then there will be one CACHE_CHUNK, otherwise it will have as many as the number of chunks granted by the operating system while allocating memory for the named cache.

Cache Manager Layout

Figure 9:
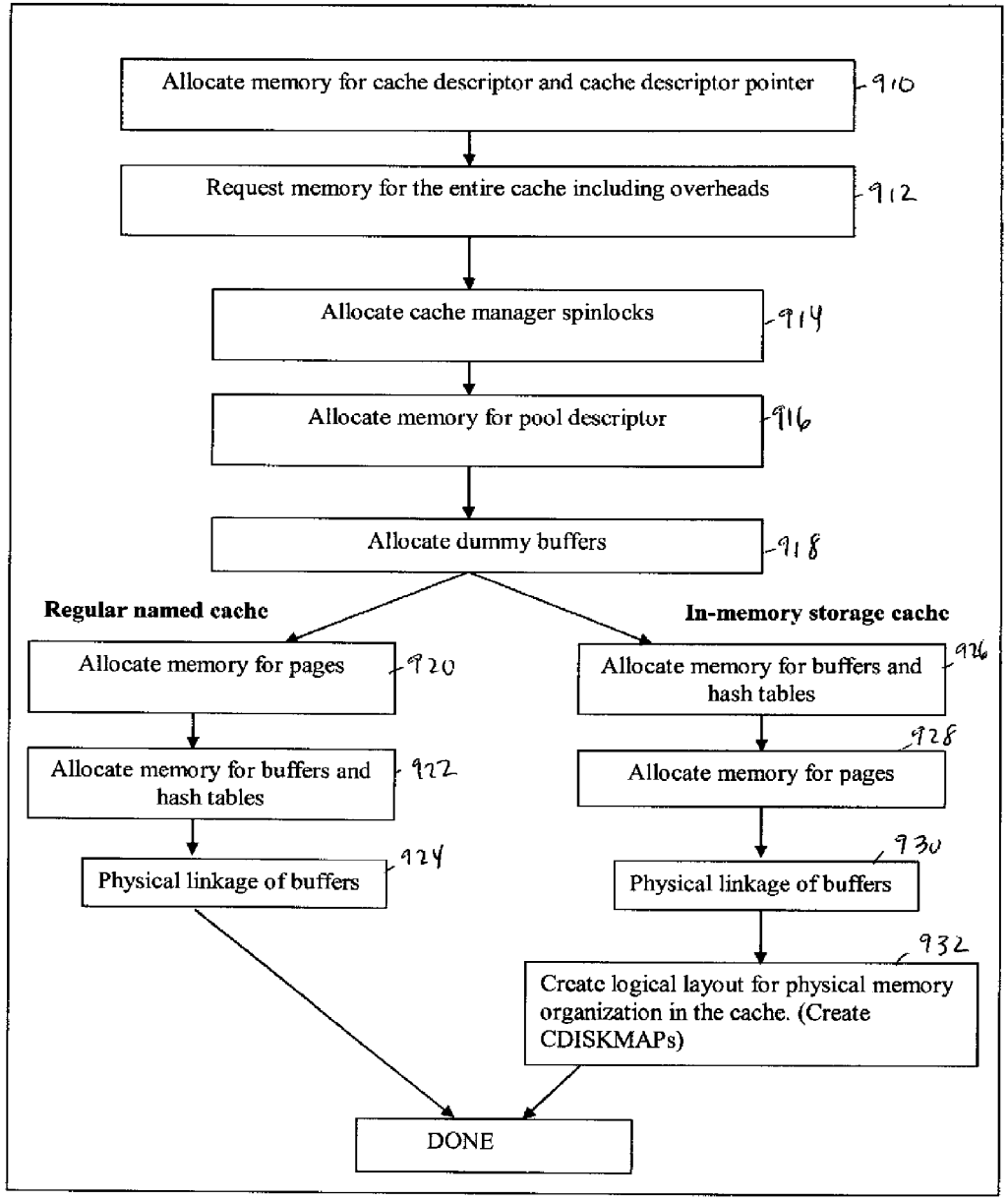
FIG. 9 illustrates a block flow diagram of a flow to create a new cache that demonstrates changes to the conventional flow for the creation of an IMDB in accordance with an embodiment of the invention.

In general, a named in-memory storage cache is created in much the same manner as currently done to create a regular named cache, where the routines to initialize and configure the cache/pool etc. are not changed, but the routines to allocate the memory and pages, as well as initialization of buffer pool, are changed to support the IMDB feature. Referring now to FIG. 9, a block flow diagram of a flow to create a new cache is illustrated that demonstrates changes to the conventional flow for the creation of an IMDB.

As shown, the process includes acts for allocating memory for a cache descriptor and a cache descriptor pointer (block 910). A request for memory for the entire cache including overheads follows (block 912). Allocation of cache manager spinlocks (block 914), occurs, followed by allocation of memory for a pool descriptor (block 916), and allocation of dummy buffers (block 918). Conventional processing continues for regular named caches, with the process then allocating memory for pages (block 920) and allocating memory for buffers and hash tables (block 922) before the physical linkage of the buffers (block 924).

A change in the processing is performed for IMDB cache creation following the allocation of the dummy buffers (block 918). As shown, the allocation of the buffers and hash tables (block 926) occurs prior to the allocation of the pages for memory (block 928). With pages allocated as the last part of the cache, the memory which will be used by the pages can be predicted and the memory chunks can be aligned by the allocation unit size (e.g., 256), as described in more detail herein below. The physical linkage of the buffers then occurs (block 930), followed by the initialization of the cache device (block 932).

A layout 1000 resulting from the cache allocation for regular cache is illustrated in FIG. 10, while a layout 1100 resulting from the cache allocation for an in-memory caches is illustrated in FIG. 11. In the layouts 1000 and 1100, c1_ht represents the hash table for the first cache partition, c2_ht represents the hash table for the second cache partition, etc. Further, as shown, the processes for cache creation and allocation result in page data allocated as a last part of the in-memory cache layout in accordance with an embodiment of the invention.

Figure 12:
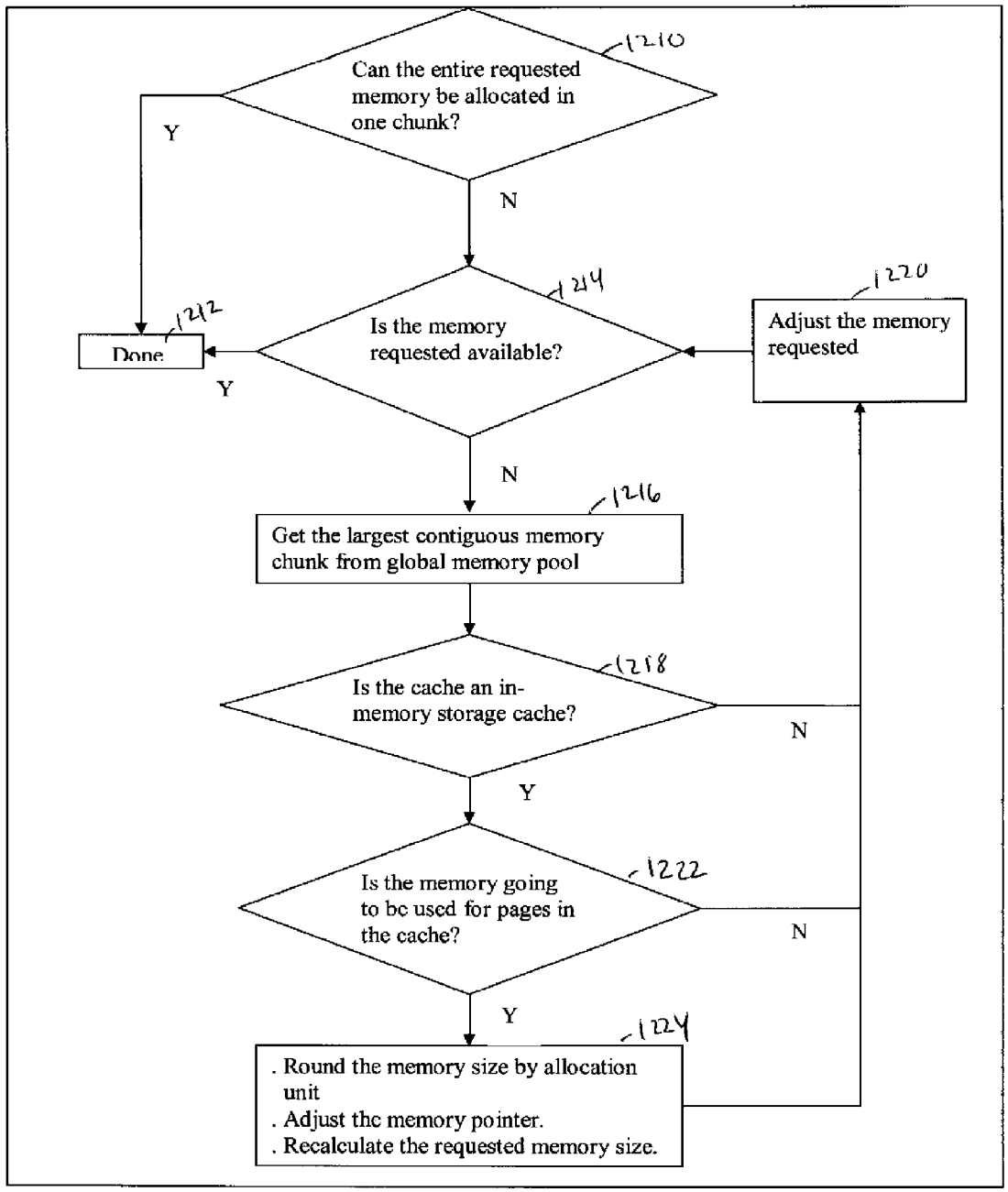
FIG. 12 illustrates a block flow diagram of a process to allocate the cache memory for the cache creation in accordance with embodiments of the invention.

FIG. 12 illustrates a block flow diagram of a process to allocate the cache memory for the cache creation in accordance with embodiments of the invention. In general, the named caches used to host an IMDB are required to be large enough to host the entire database. These caches are different from traditional named caches in that every page in the database will be resident in the cache, without any buffer replacement or I/O to disk. Caches created to host IMDBs cannot be used to bind other databases or other objects, unlike traditional caches that are subject to buffer reuse and I/Os to disk. In an embodiment, the minimum size of a cache device is 256 logical pages, which is the same limit as the minimum size of a named cache. On a 2K page size, this is 512K. The minimum size of a database fragment on any device, disk or cache, remains the same as the size of one allocation unit (i.e., 256 logical pages).

The process initiates by determining whether the entire requested memory can be allocated in one chunk (block 1210). When the entire requested memory can be allocated in one chunk, the allocation is completed (block 1212) using the entire requested memory. When allocation cannot occur in one chunk, the process proceeds by determining whether there is enough memory available for the requested memory (block 1214). When there is not enough memory available, the largest contiguous memory chunk from the global memory pool is retrieved (block 1216) for allocation. When the cache is not an in-memory storage cache (block 1218 is negative), the process adjusts the memory requested based on the retrieved chunk allocated (block 1220) and proceeds in this manner while more chunks need to be allocated and there is available memory.

When the cache is an in-memory cache (block 1218 is affirmative), the process determines whether the memory being allocated is to be used for pages in the cache (block 1222). When not true, the process proceeds with adjustment of the memory requested (block 1220). When true, the memory size is rounded by the allocation unit size, the memory pointer is adjusted, and the requested memory size is recalculated (block 1224), before the process continues with the adjustment of the memory requested via block 1220.

The memory allocation for the cache can be divided by a cachelet, where cachelets refer to $2^n$ partitions of a named cache. For the in-memory cache, once created, the number of cachelets is fixed from the configuration. The buffer and page memory get allocated to the cachelets. The buffer headers and pages are formatted, and a 1-to-1 mapping is created between the buffer headers and the pages. Once the database is bound to the cache, the pages and buffer headers are initialized with the database and page identity. The identity is hashed into a hash table for each cachelet, and which, once fixed, does not change throughout the life cycle. The location of the buffer or the page also does not change. Thus, while the pages may get allocated to different tables in the database or get de-allocated from one table and get re-allocated to different table, the identity of the page or the buffer does not change and remains hashed.

In an embodiment, the supported number of cache partitions is one of 2, 4, 8, 16, 32, 64 and 128. The memory allocation for the cache is divided by the cachelet, and every cachelet allocates the memory for the buffers and pages differently. The buffer memory and the page memory may not necessarily be in a single chunk, and thus, multiple memory chunks could be allocated for each buffer and page, where the buffer chunks are divided into buffer headers and page chunks are divided into the pages. A cachelet descriptor is used to keep track of these different chunks.

Referring to FIG. 13, an example diagram of an in-memory cache named "SALES" having 4 cachelets, 1302, 1304, 1306, and 1308, is illustrated. In this example, a set of 8 contiguous pages starting from page ID 0 are referred to as an extent. Certain page numbers (i.e., extents) map to a specific cachelet depending on the page number, number of cachelets and other static parameters. Further, for the in-memory cache, extents in a cachelet can be hashed in a different cachelet's hash table. In FIG. 13, all the boxes with the same grid pattern within each cachelet represent the pages hashed in that cachelet's hash table. Additionally, preferably, the pages in the cache are laid out sequentially during database creation in order that a more efficient search algorithm can be used that takes advantage of the sequential layout to locate the buffer header and page more effectively. In this manner, once the cachelet holding the database page is identified, a hash table look-up can be performed for the page.

Page partitioning for a cachelet maps the data pair of database ID and page number to a unique cache partition, such that all 8 contiguous pages map to the same cache partition. Concurrent accesses to pages within an extent are controlled by the cache manager spinlock of the cache partition the pages hash to, such that these accesses will not conflict for the cache manger spinlock due to concurrent accesses to pages in adjacent extents, as is well understood in the art. Depending on the number of cache partitions configured, the overlap in the cache manager spinlock due to page accesses on random pages from different extents can be greatly decreased.

During steady state operations of the buffer/cache manager, no new buffer is hashed or old buffer un-hashed. As all the pages allocated to a table or the remaining unallocated pages are hashed, there is no need for getting new buffers to get new pages. With the I/O disabled for in-memory cache, all the changes made to the database are logged to the in-memory log pages and nothing gets flushed. However, in an embodiment, all the pages which are changed (i.e., "made dirty"), are bookmarked, which allows for the possibility to provide some form of periodic persistence to the disk for all the changed pages, if desired.

Logical Layout of in-Memory Storage Caches

In the case of in-memory caches, there are additional structures associated with the cache that are introduced as a part of the cache initialization phase (FIG. 9, block 932). One such structure used for mapping the in-memory database logical page numbers into physical address of the page is the CDISKMAP structure, which gives a logical representation of the memory chunk in the cache. This maintains the core information for calculating the physical address of the given database logical page number and is created after allocating memory for the cache. If there are multiple chunks in the cache, then one CDISKMAP for each chunk is created and stored as a frame, CDMAPFM, to hang from a control cachelet descriptor. Logical map creation starts from the $0^{th}$ chunk in the cachelet 1 and continues to create a CDISKMAP for each of the chunk till the last chunk in the last cachelet. The maximum size of the cache device is determined after creating the CDISKMAP for each of the memory chunks in the cache.

Figure 14:
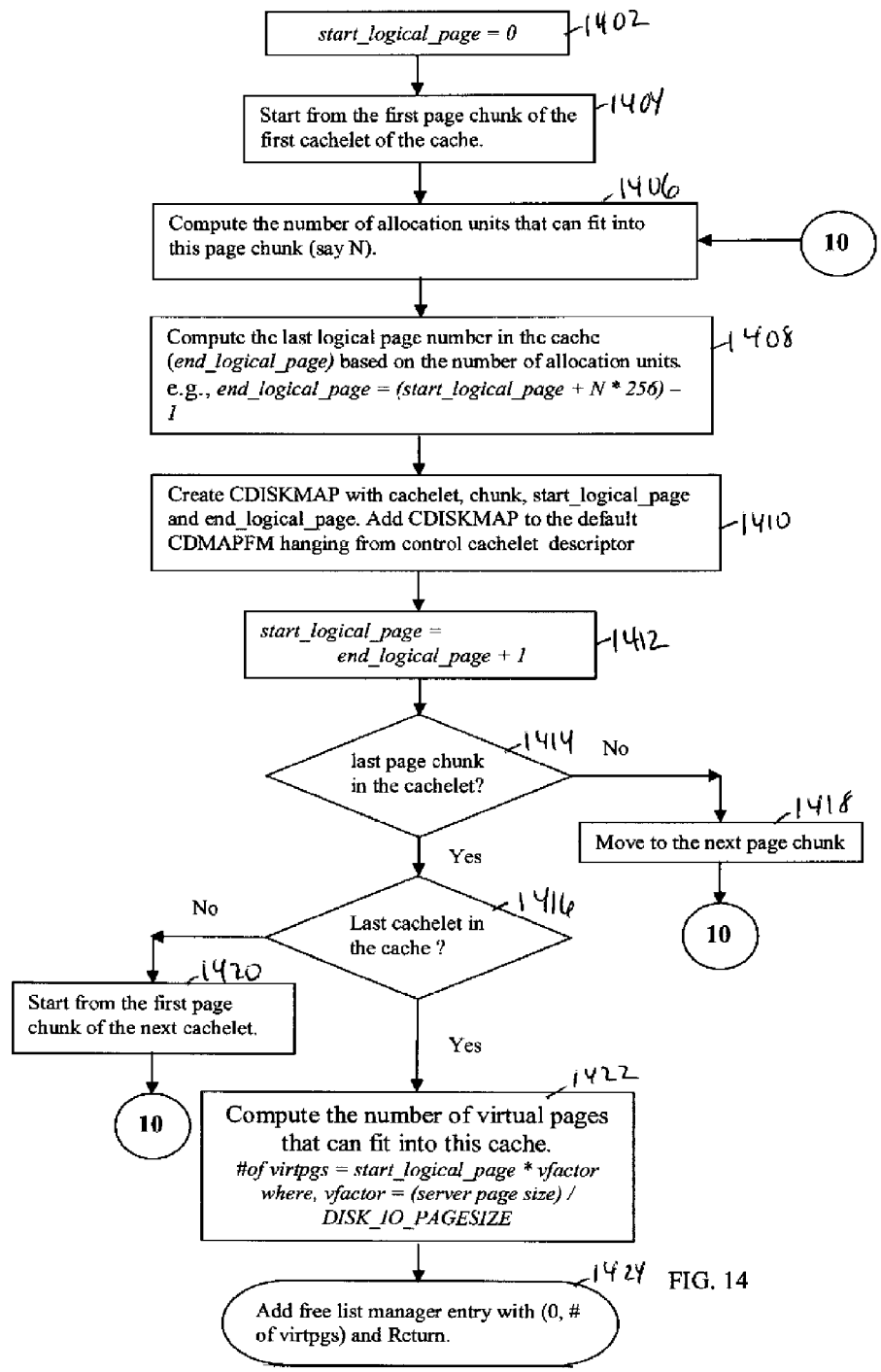
FIG. 14 illustrates a block flow diagram of a process to create the CDISKMAP structures spanning the physical space available across each chunk and across each cache partition of an in-memory storage cache in accordance with an embodiment of the invention.

FIG. 14 illustrates a block flow diagram of a process to create the CDISKMAP structures spanning the physical space available across each chunk and across each cache partition of an in-memory storage cache in accordance with an embodiment of the invention. The process begins by initializing the starting logical page number to zero (block 1402) and begins from the first page chunk of the first cachelet in the cache (block 1404). The number of allocation units (N) that can fit into the current page chunk is computed (block 1406), based on a given allocation unit amount, e.g., 256. With the number of allocation units computed, the ending logical page number is computed (block 1408), e.g., the end_logical_page=(start_logical_page+N*256)−1. A CDISKMAP is then created based on the cachelet, the chunk, the start_logical_page and end_logical_page, and the CDISKMAP is added to the default CDMAPFM hanging from control cachelet descriptor (block 1410). The next starting logical page number for the next chunk is set by incrementing the ending logical page number of the previous chunk (block 1412). When there are still page chunks in the cachelet (as determined via block 1414) or more cachelets (as determined via block 1416), the process returns to block 1406 to repeat the process for the current page chunk of the current cachelet, where the transition to the current cachelet is done via block 1418. Once all the page chunks of all the cachelets are accounted for, the number of virtual pages (virtpgs) that can fit into the cache is computed (block 1420), e.g., according to the following formula, # of virtpgs=start_logical_page*vfactor where, vfactor=(server page size)/DISK_IO_PAGESIZE. An entry is then added to the free list manager with the current entry number and the number of virtual pages (block 1422).

Figure 15:
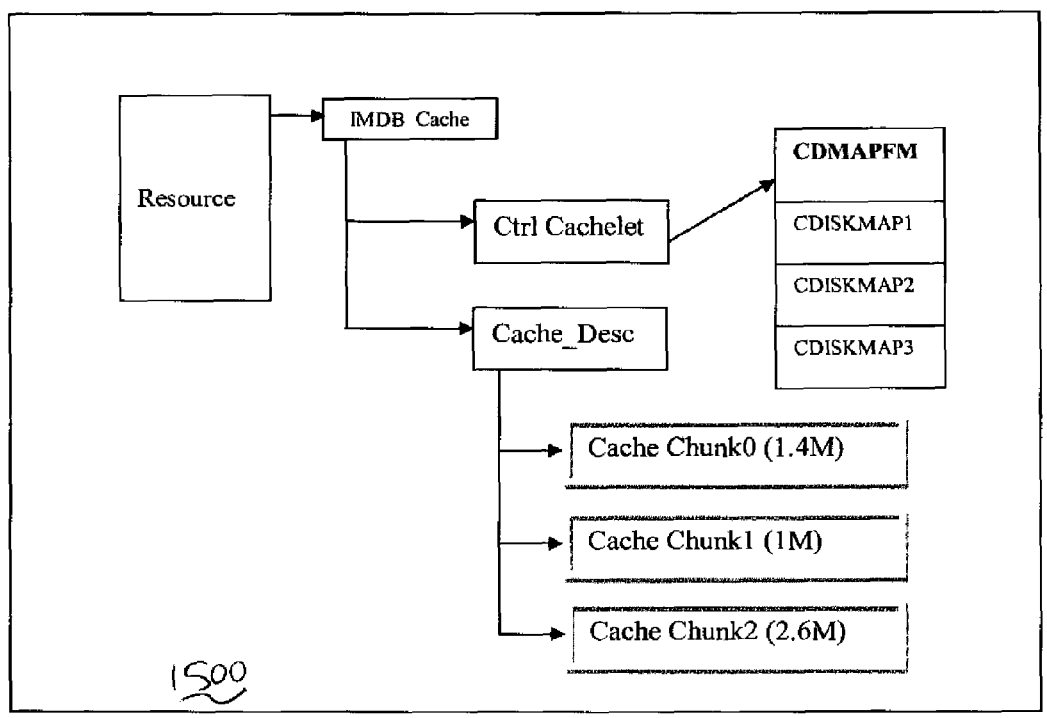
FIG. 15 illustrates a layout of the page space associated with the cache for an example in accordance with an embodiment of the invention.

By way of example, consider a server with 2K page size having a named cache having page space of 5 MB size and created in 3 chunks. FIG. 15 illustrates the layout 1500 of the page space associated with the cache for this example. Chunk0 has 1.4M but can hold 2 allocation units (i.e. from logical page 0 to 511) and is represented by CDISKMAP1. Chunk1 can hold 2 allocation units (i.e. from logical page 512 to 1023) and is represented by CDISKMAP2. Chunk2 can hold 5 allocation units (i.e. from logical page 1024 to 2303) and is represented by CDISKMAP3. It is clear from the example that there might be fragmentation in the cache due to the logical page numbering, and the total number of pages for creating the devices is not the same as the cache size.

Figure 16:
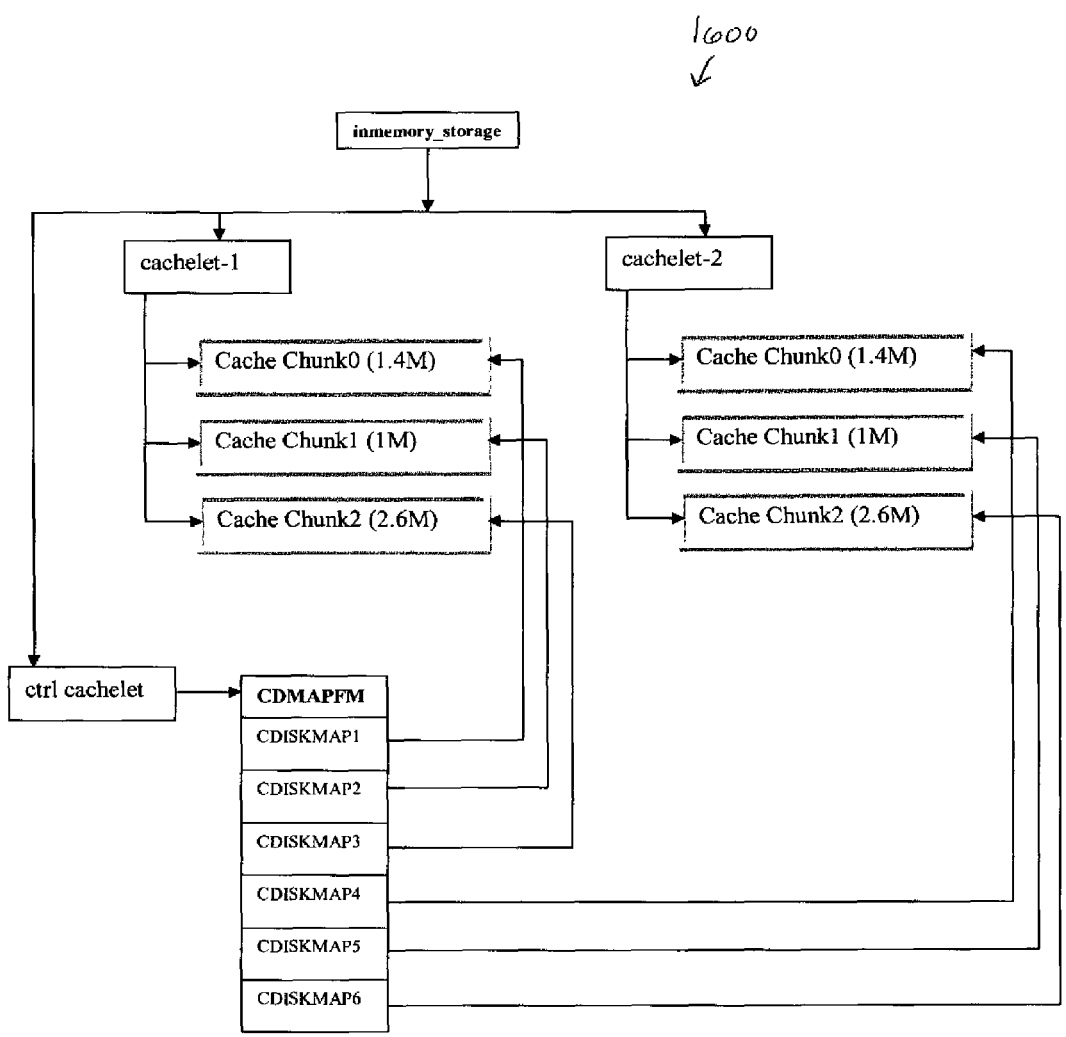
FIG. 16 illustrates a layout of an example in-memory storage cache with 2 cachelets each having 3 page memory chunks in accordance with an embodiment of the invention.

By way of further example, FIG. 16 illustrates the layout 1600 of a 10 MB in-memory storage cache with 2 cachelets each having 3 page memory chunks. CDISKMAP1 to CDISKMAP6 shown in FIG. 17 represent the logical layout of the cache. It is clear from both FIG. 16 and FIG. 17 that the logical page number is monotonically increasing across the page chunks of the cachelets or sub caches, e.g., CDISKMAP3 ends with logical cache page 2303 and CDISKMAP4 starts with the next logical page number, i.e. 2304.

Figure 18:
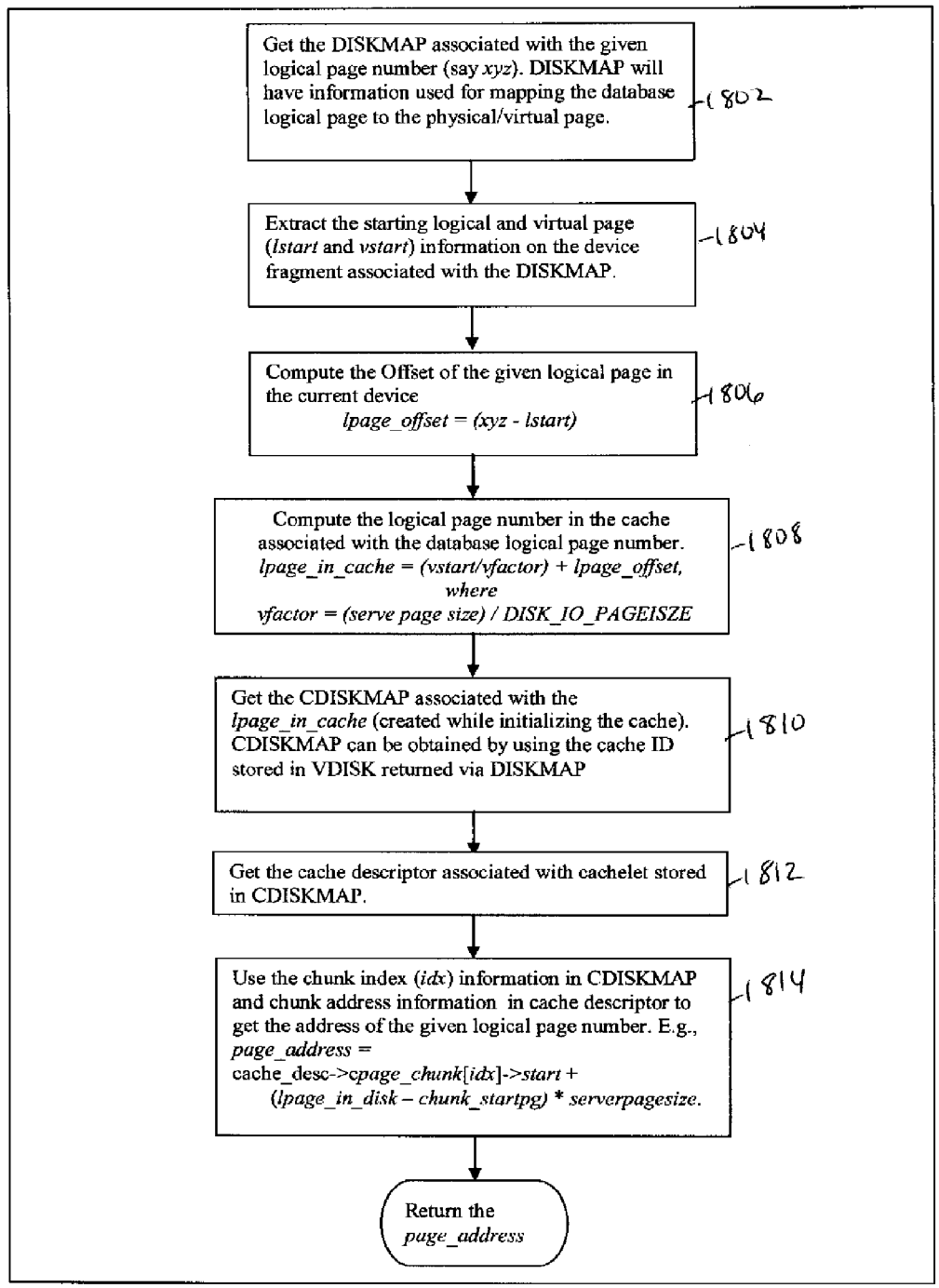
FIG. 18 illustrates a block flow diagram for a process to map the database logical page number to a physical address in accordance with an embodiment of the invention.

Referring now to FIG. 18, a block flow diagram for a process to map the database logical page number to a physical address is presented. In general, the process uses the DISKMAP (created as a part of CREATE DATABASE command) and CDISKMAP (created as a part of cache initialization) structures and returns the address. The process initiates by retrieving the DISKMAP for the given logical page number (block 1802) and extracts the starting logical and virtual page (lstart and vstart) information on the device fragment associated with the DISKMAP (block 1804). The offset of the page in the device fragment associated with DISKMAP is then computed based on the extracted data (block 1806), e.g., by subtracting the starting logical page from the given logical page number. This logical page offset is then used to get the logical page number in the cache (block 1808), e.g., according to lpage_in_cache=(vstart/vfactor)+lpage_offset, where vfactor=(server page size)/DISK_IO_PAGESIZE.

The mapping process continues by retrieving the CDISKMAP for the computed logical page number in the cache (block 1810) by using the cache ID stored in the VDISK returned via the DISKMAP, and retrieving a cache descriptor associated with a cachelet in the retrieved CDISKMAP (block 1812). The resultant information, i.e., the cache information, page chunk information, starting logical page in the cache and end logical page in the cache, is used for computing the address of the given database logical page (block 1814), e.g., page_address=cache_desc→cpage_chunk[idx]→start+ (lpage_in_disk-chunk_startpg)*serverpagesize. Thus, address computation starts by finding the offset of the logical page of the cache in the current page chunk (represented by CDISKMAP). The starting address of the page chunk, along with the offset multiplied by the server page size, gives the required page address that is returned.

By way of example, consider the cache shown in FIG. 16 with 2 cachelets having two devices (dev1 and dev2) of size 4.5 MB each in a 2K logical page size server, each device using three chunks in each cachelet, created by:

---
create inmemory database myimdb
on dev1='4.5M' log on dev2='4.5M'
---

Note from FIG. 16, the size of each cachelet is 5M, but the devices themselves do not span the entire 5M. DISKMAP information 1902 and 1904 for the above database is shown in FIG. 19. Mapping a database logical page number to a physical address of the in-memory database utilizes the DISKMAP information 1902, 1904. For example, in order to calculate the physical address of the logical page 3350 in myimdb, it is first determined that the DISKMAP associated with database logical page ID 3350 is the one with vdevno=2 Subsequently, the logical page offset is determined, lpage_offset=(3350−2304)=1046, as well as the logical page number in the cache, lpage_in_cache=(2304+1046)=3350. The corresponding CDISKMAP is retrieved, i.e., the CDISKMAP for 3350 (with vdevno=2) is the CDISKMAP6. The cache descriptor for cache ID 1 and cachelet 2 is retrieved, and the chunk index from CDISKMAP6 is found to be 6. According to the formula presented in block 1814, the physical address is determined, e.g., cache_desc→cpage_chunk[6-1]→start+(3350−3328)*2K gives the address of the page 3350.

Data Organization in an In-Memory Database

Figure 20:
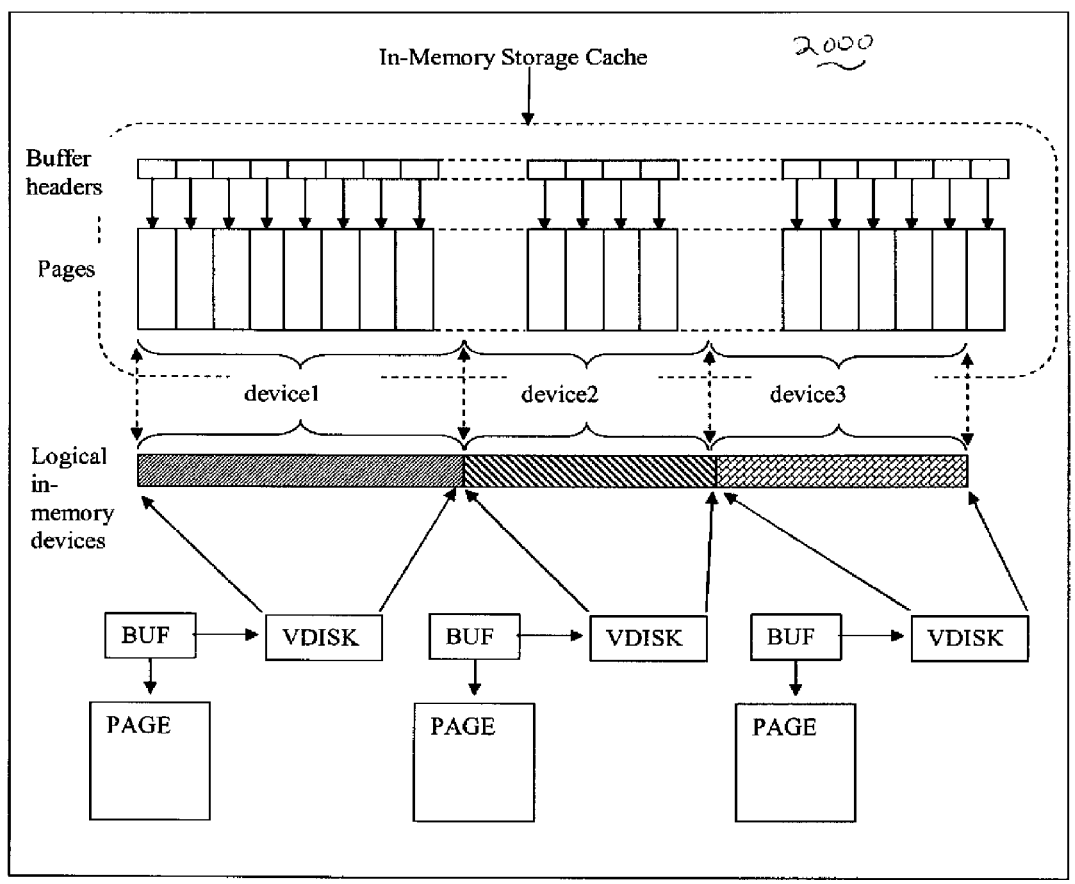
FIG. 20 illustrates a layout of an in-memory database created in an in-memory storage cache over-laying in-memory devices corresponding to the example of FIG. 5 in accordance with an embodiment of the present invention.

A representation of the data organization in an in-memory database as a result of the processes in accordance with embodiments of the invention is presented with reference to FIG. 20, which shows a layout 2000 of an in-memory database created in an in-memory storage cache over-laying in-memory devices, and the buffer/page structures linked to the I/O VDISK structure on three in-memory devices, such as from the example of FIG. 5. As illustrated, the in-memory storage cache is laid out like a sequential array of buffer headers, each buffer pointing to a database page. As previously described, buffer headers are contiguous in large chunks, the page structures are contiguous, and memory is allocated so that any discontinuity in memory addresses for pages occurs at multiples of allocation unit chunks, e.g., multiples of 256 logical pages. Thus, given a page ID, the buffer manager is able to efficiently locate the buffer header and start of the page address holding the contents of the specified page.

Each buffer header through some level of indirection points to a virtual disk structure, VDISK. In the case of IMDBs, this VDISK access is essentially defunct as there is no physical storage requiring I/O. Further, conventional named caches allow buffer washing, buffer replacement, and flushing of dirty buffers to disk, all of which rely on the existence of physical devices at the other end of the I/O. For an IMDB, as there are no physical devices attached to the database, the cache-devices, i.e. the cache itself, will support none of these operations.

As presented herein, with the embodiments of the present invention, a fully integrated in-memory database support is achieved, without using any other external software components, or other operating system support. IMDB technology is provided by re-deploying and extending native DBMS technologies, such as named caches with enhanced support to turn OFF I/O at the buffer manger level. Seamless integration within the DBMS allows for fully connectivity support using native TDS, JDBC, ODBC and other standard network connection interfaces to the DBMS server, while no changes are required to client drivers like CT-lib or jConnect, as is well appreciated by those skilled in the art. Further, full SQL support occurs as in any disk-resident database, and full integration provides for future development to be offered natively on the in-memory databases, as well as disk-resident databases. Thus, existing applications connecting to the DBMS server remain unchanged and can run essentially unchanged.

Further, in general, applications that are executing against an IMDB should experience reduced latency, and improved response times. In particular, it is expected that at least in some applications which perform heavy I/O due to logging, are mainly transactional in nature, and/or work with large volumes of rows (e.g. a large batch delete), the features provided through the embodiments of the invention will improve the performance characteristics of such applications.

While the invention is described in some detail with specific reference to a preferred embodiment and certain alternatives, there is no intent to limit the invention to that particular embodiment or those specific alternatives. Further, the description presents methods that may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server). Those skilled in the art will appreciate that modifications may be made to the preferred embodiment without departing from the teachings of the present invention.

What is claimed is:

1. A computer implemented method for managing data storage as an in-memory database in a database management system (DBMS), comprising:

providing a database type as a parameter of a native DBMS command, wherein the database type is configured for creation of the in-memory database in one or more named cache devices;

creating an in-memory storage cache, wherein allocation of memory for buffers and hash tables occurs prior to allocation of memory for pages in the in-memory storage cache; and forming the database hosted entirely in-memory of the DBMS when the database type is specified as a named cache type, wherein the database is hosted in the one or more named cache devices without input/output (I/O) to a disk device in operation.

2. The method of claim 1, wherein the database type comprises an in-memory cache type.

3. The method of claim 1, wherein the forming the database further comprises forming the database entirely in a buffer cache.

4. The method of claim 3, wherein the forming the database further comprises utilizing a layout in the buffer cache for the database distinct from a disk-resident database cache layout to avoid buffer cache movement during runtime.

5. The method of claim 4, wherein the forming further comprises laying out a sequential array of buffer headers in the buffer cache.

6. The method of claim 1, wherein the native DBMS command comprises a create database command.

7. The method of claim 1, wherein the forming further comprises creating at least one in-memory logical device.

8. The method of claim 7, further comprising mapping data and log segments to the at least one in-memory logical device.

9. The method of claim 1, further comprising mapping database logical pages to physical addresses in memory, wherein searching the memory occurs without hashing.

10. The method of claim 1, further comprising utilizing SQL to manipulate the database.

11. The method of claim 1, further comprising interfacing with the database through the DBMS.

12. The method of claim 11, further comprising interfacing via a chosen DBMS connectivity protocol.

13. The method of claim 11, further comprising interfacing without a dedicated interface or client driver.

14. The method of claim 11, further comprising interfacing with the database using an interface for communicating to a disk-resident database of the DBMS.

15. The method of claim 14, wherein DBMS enhancements operate natively on the in-memory.

16. The method of claim 1, wherein the database type is configured for creation of the entire database in one or more named cache devices with zero-disk footprint.

17. A system for managing storage of data objects in-memory in a distributed database system, the system comprising:
a database server including one or more processors for executing instructions and a memory for temporarily storing data objects;
at least a portion of the memory of the database server allocated as a named buffer cache of a database type for specified data objects, wherein the database type is configured for creation of an entire database in one or more named cache devices, and wherein allocation of memory for buffers and hash tables occurs prior to allocation of memory for pages in the named buffer cache; and
the database server engine forming the database hosted in the memory when the database type is specified as a named cache type, wherein the database is hosted in the one or more named cache devices without input/output (I/O) to a disk device in operation.

18. The system of claim 17, wherein the database type comprises an in-memory cache type.

19. The system of claim 17, wherein the database server engine further forms the database entirely in a buffer cache.

20. The system of claim 19, wherein the database server engine further forms the database with a layout in the buffer cache for the database distinct from a disk-resident database cache layout to avoid buffer cache movement during runtime.

21. The system of claim 17, wherein the database type is specified in a native DBMS command comprising a create database command.

22. The system of claim 17, wherein the database server engine further forms the database by creating at least one in-memory logical device.

23. The system of claim 22, wherein the database server engine further forms the database by mapping data and log segments to the at least one in-memory logical device.

24. The system of claim 17, wherein the database server engine manipulates the database, including in response to SQL commands.

25. The system of claim 17, wherein the database type is configured for creation of the entire database in one or more named cache devices with zero-disk footprint.

26. A non-transitory computer-readable medium having instructions stored thereon that, when executed by a processor, cause the processor to perform operations for managing data storage as an in-memory database in a database management system, the operations comprising:
providing a database type as a parameter of a native DBMS command, wherein the database type is configured for creation of the in-memory database in one or more named cache devices;
creating an in-memory storage cache, wherein allocation of memory for buffers and hash tables occurs prior to allocation of memory for pages in the in-memory named cache device; and
forming the database hosted entirely in-memory of the DBMS when the database type is specified as a named cache type, wherein the database is hosted in the named cache devices without input/output (I/O) to a disk device in operation.

27. The non-transitory computer-readable medium of claim 26, wherein the database type comprises an in-memory cache type.

28. The non-transitory computer-readable medium of claim 26, wherein the forming the database further comprises forming the database entirely in a buffer cache.

29. The non-transitory computer-readable medium of claim 28, wherein the forming the database further comprises utilizing a layout in the buffer cache for the database distinct from a disk-resident database cache layout to avoid buffer cache movement during runtime.

30. The non-transitory computer-readable medium of claim 26, wherein the native DBMS command comprises a create database command.

31. The non-transitory computer-readable medium of claim 26, wherein the forming further comprises creating at least one in-memory logical device, and mapping data and log segments to the at least one in-memory logical device.

32. The non-transitory computer-readable medium of claim 31, further comprising interfacing with the database using an interface for communicating to a disk-resident database of the DBMS.

33. The non-transitory computer-readable medium of claim 26, wherein the database type is configured for creation of the entire database in one or more named cache devices with zero-disk footprint.

* * * * *